March 3, 1959 G. H. EASH 2,876,005

RECORDER-PLAY BACK INSTRUMENT EMPLOYING ENDLESS MAGNETIC TAPE

Filed March 14, 1956 2 Sheets-Sheet 1

INVENTOR.
GEORGE H. EASH
BY
Malcolm W. Fraser
ATTORNEY

March 3, 1959 G. H. EASH 2,876,005

RECORDER-PLAY BACK INSTRUMENT EMPLOYING ENDLESS MAGNETIC TAPE

Filed March 14, 1956 2 Sheets-Sheet 2

INVENTOR.
GEORGE H. EASH
BY [signature]
ATTORNEY

United States Patent Office 2,876,005

Patented Mar. 3, 1959

2,876,005

RECORDER-PLAY BACK INSTRUMENT EMPLOYING ENDLESS MAGNETIC TAPE

George H. Eash, Toledo, Ohio, assignor, by mesne assignments, to The Toledo Trust Company, Toledo, Ohio, trustee, a corporation of Ohio Application March 14, 1956, Serial No. 571,420

4 Claims. (Cl. 271—2.18)

This invention relates to recorder-play back instruments employing an endless magnetic tape and an object is to improve previous structures of this character to enable the cartridge to be readily and conveniently moved to and effectively retained in its driving relation to the operating capstan of the instrument as well as the transducer head, insuring that the tape is properly driven while the instrument is in operation and also making possible the expeditious removal of the tape from driving relation in a novel manner. To this end, it is a further object to improve the structure of both the tape cartridge and the recorder-play back instrument.

Figure 1:
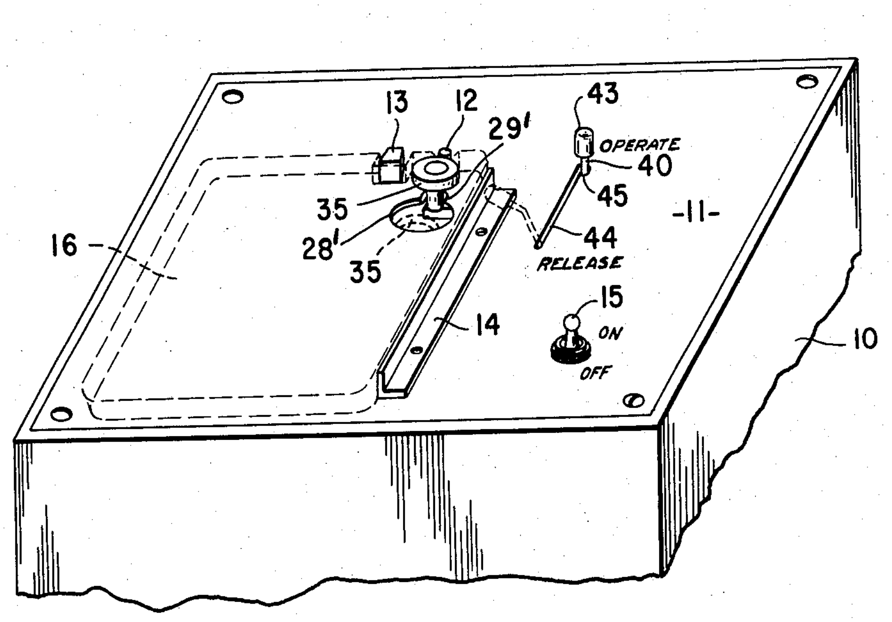
Figure 3:
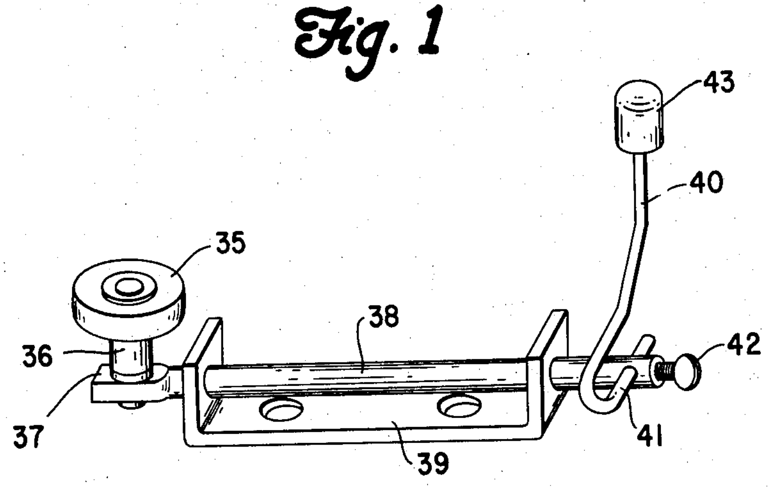
Figure 2:
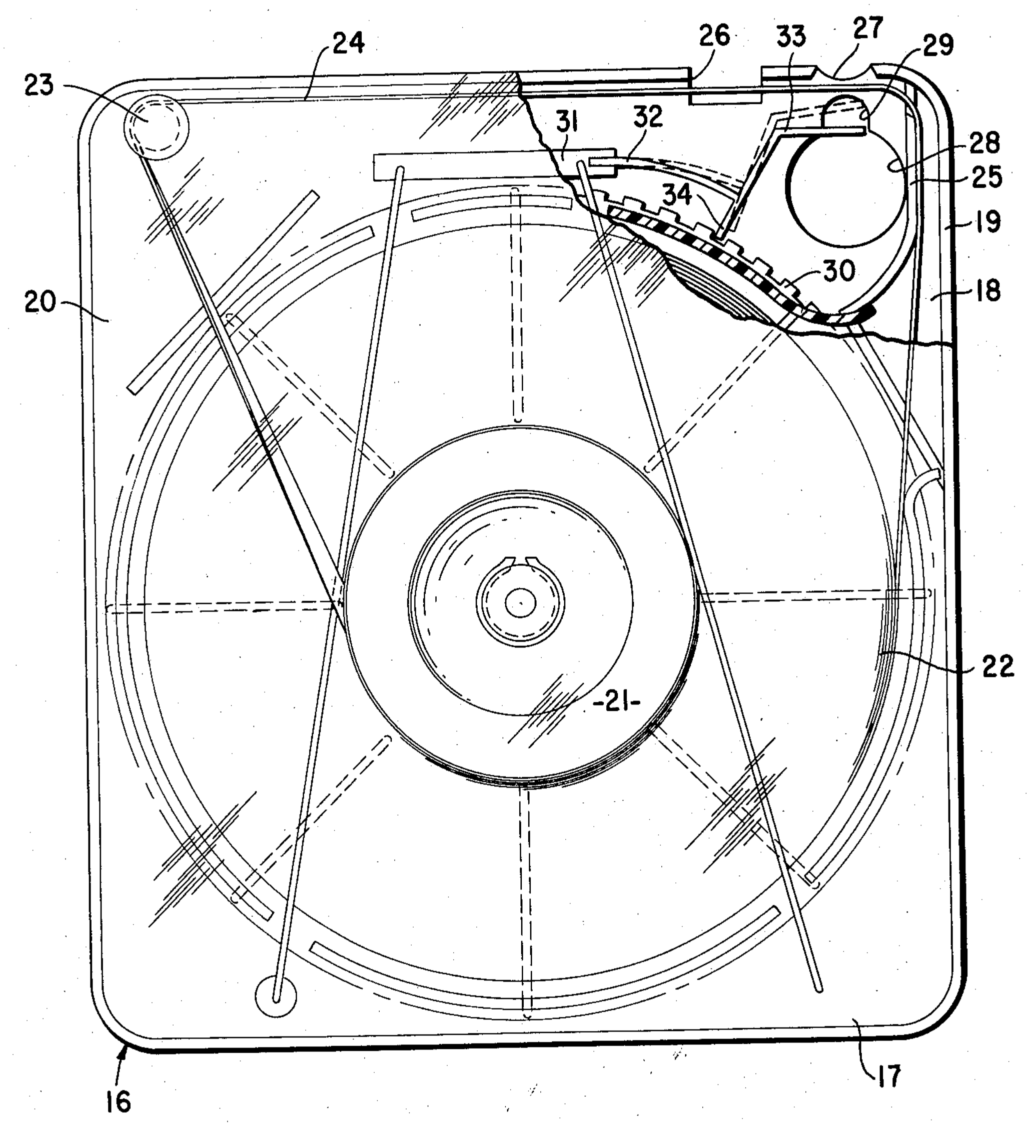

Other objects and advantages of the invention will hereinafter appear and for purposes of illustration but not of limitation, an embodiment of the invention is shown on the accompanying drawings in which Figure 1 is a top perspective view of a recorder-play back instrument showing the pinch roll in full lines in the operative position and in broken lines in the inoperative position;

Figure 2 is a top plan view with portions broken away and on an enlarged scale of the endless magnetic tape cartridge; and Figure 3 is a perspective view of the pinch roll and its associated parts.

The illustrated embodiment of the invention comprises a recorder-play back instrument having a rectangular housing 10 having a top panel 11 through which projects a driving capstan 12 which is driven by a suitable electric motor contained within the housing and not shown on the drawing. Alongside the capstan 12 is a transducer head 13 and at one side of the capstan 12 and providing a positioning guide for the tape cartridge is an angle strip 14 secured by screws to the top panel 11. 16 designates the endless magnetic tape cartridge and it will be observed on Figure 1 that one side wall abuts against the angle strip 14 to position it relative to the capstan 12 and transducer head 13. The cartridge has a substantially rectangular housing 17 which may be plastic or any suitable material and is formed with a flat bottom wall 18 and upstanding side walls 19 to the upper edges of which is secured a top wall or panel 20. Within the housing is a rotatable reel 21 on which is an endless coil of magnetic tape 22. The specific construction of the tape coil and its mounting forms no part of the present invention but reference is made for a complete description thereof to my copending application Serial No. 526,406 filed August 4, 1955, now Patent No. 2,778,880 and entitled "Endless Magnetic Tape Cartridge and Recording Play-Back Instrument Mounting Same." Adjacent a corner between side walls is an upright guide post 23 and trained about the post 23 is the exposed portion 24 of the tape which extends parallel with the adjacent side wall as indicated on Figure 2 and thence passes over a suitable guide flange 25 carried by the bottom panel 18 of the housing, the exposed portion thus passing back to the outside of the coil. It will be understood that the tape passes from the innermost convolution of the coil to the guide post 23 and thence back to the periphery of the coil as will be readily understood by those skilled in this art.

In order to reveal a portion of the exposed tape portion 24 there is a cutout 26 in the housing to accommodate the transducer head 13. Spaced from the cutout 26 is an arcuate capstan-receiving cutout 27. Adjacent the arcuate cutout 27 and formed in the bottom panel 18 of the housing is a relatively large round hole 28 which has a forwardly extending arcuate branch 29 closer to the cutout 27.

On the bottom flange or disc of the tape supporting reel 21 which projects outwardly beyond the periphery of the tape coil, is an endless series of notched or toothed elements 30, which actually form the periphery of the reel flange. Rigid with the bottom panel 18 of the housing is an upstanding bracket 31 to which is rigidly secured one end of a spring arm 32 and integral with or fixed to the free or outer end of the arm 32 is an L-shaped actuating arm 33, the end portion of which is normally disposed in the region of the juncture between the branch opening 29 and the large round opening 28 as indicated on Figure 2. Forming part of the L-shaped arm 33 and extending in the opposite direction therefrom is a notch-engaging extension 34 which is adapted to enter one of the notches 30 for positively locking the reel against rotative movements. As shown, the extension 34 may be moved away from the notched periphery of the reel to enable rotation of the latter, this being shown by broken lines on Figure 2.

A pinch wheel 35 carried by the housing of the recorder-play back instrument is adapted to move up through an opening 28' in the top panel 11 and extend through the large round opening 28 of the tape cartridge, first to engage the end portion of the L-shaped arm 33 to release the reel brake and then press the adjacent exposed portion 24 of the tape against the driving capstan 12. The openings 28' and 29' in the panel 11 register with those of the tape cartridge. As shown, the pinch wheel 35 has a laterally extending hub 36 for engaging the reel brake and is mounted for rotation on a flattened end portion 37 of a transverse shaft 38. The shaft 38 is rotatably mounted in a U-shaped bracket 39 which is suitably secured inside of the housing 10. For rocking the pinch wheel 35 to and from its operative position, a somewhat springy arm 40 having a U-shaped bent end portion 41 which is extended through a transverse hole in the opposite end portion of the shaft 38, may be moved from one position to another for this purpose. A set screw 42 in the end of the shaft 38 secures the arm 40 in position, enabling convenient assembly of the parts.

The arm 40 projects through an elongate slot 44 in a top panel 11 and a knob 43 on the exposed end of the arm 40 enables operation thereof. Thus by moving the knob 43 forwardly or in a direction toward the capstan 12, the pinch roll 35 is brought upwardly through the hole 28' in the top panel 11, through the hole 28 in the cartridge, moved forwardly so that the hub 36 can engage the L-shaped end 33 of the reel brake moving it to inoperative position and then pressing the exposed portion 24 of the tape against the driving rotating capstan so that the latter can effect the translatory movement of the tape. To hold the arm 40 forwardly so that the pinch roll is in operative position, a lateral notch 45 is provided so that the arm can be slipped into the notch for holding the parts positively in position of use. Manifestly by rearward swinging movement of the arm 40, the pinch roll 35 moves to its inoperative position releasing the magnetic tape and enabling the cartridge 16 to be removed if desired.

Numerous changes in details of construction, arrangement, operation and choice of materials may be effected without departing from the spirit of the invention, especially as defined in the appended claims.

What I claim is:

1. A recorder-play back instrument comprising a housing having a top panel, a driving capstan projecting above said panel, a transducer head adjacent said capstan, a pinch roll adapted to press magnetic tape against said capstan, a mounting for said pinch roll enabling same to be swung inside the housing through an opening therein when not in use or to an operative position above said panel, said mounting comprising a rock shaft, and a manual arm secured to the rock shaft and accessible above the panel for actuation, and a cartridge composed of a housing, a rotatable reel in the housing having a coil of endless magnetic tape, said cartridge housing having the opening in the bottom wall to admit said pinch roll, an exposed portion of the tape extending along a side of the cartridge housing to engage the transducer head and disposed in front of the pinch roll to enable the latter to press the tape against the capstan.

2. A recorder-play back instrument comprising a housing having a top panel, a driving capstan projecting above said panel, a transducer head adjacent said capstan, a pinch roll adapted to press magnetic tape against said capstan, a mounting for said pinch roll enabling same to be swung inside the housing through an opening therein when not in use or to an operative position above said panel, and a cartridge composed of a housing, a rotatable reel in the housing having a coil of endless magnetic tape, said cartridge housing having the opening in the bottom wall to admit said pinch roll, a spring tensioned arm in the cartridge normally engaging the reel to hold it from turning, an extension on said spring arm engageable by means associated with the pinch roll for actuating same to release the reel when the pinch roll is moved to operative position, an exposed portion of the tape extending along a side of the cartridge housing to engage the transducer head and disposed in front of the pinch roll to enable the latter to press the tape against the capstan.

3. A recorder-play back instrument adapted to employ magnetic tape comprising an instrument housing having a top panel, a rotatable driving capstan to impart translatory movement to the magnetic tape, a transducer head adjacent said capstan, a retractable pinch roll for pressing the tape against the capstan, recess means extending through said top panel in said instrument housing for receiving said pinch roll, means mounting said pinch roll on said instrument housing for movement between a retracted inoperative position in which said pinch roll lies retracted within the recess means and an extended operative position in which said pinch roll extends exteriorly of said instrument housing in position for pressing the tape against the capstan, a cartridge having a housing, a rotatable reel in the housing having a coil of endless magnetic tape, means on said top panel for locating said cartridge housing in an operative position thereon, said cartridge housing having a bottom wall with an opening therethrough to admit said pinch roll therethrough, the opening in the bottom wall of the cartridge housing registering with the recess means in the top panel in the operative position of the cartridge housing, an exposed portion of the tape extending along a side of the cartridge housing to engage the transducer head and disposed in front of the pinch roll to enable the latter to press the tape against the capstan, and means for moving said pinch roll between said positions.

4. A recorder-play back instrument adapted to employ magnetic tape comprising a housing having a top panel, a rotatable driving capstan to impart translatory movement to the magnetic tape, a transducer head adjacent said capstan, a retractable pinch roll for pressing the tape against the capstan, recess means extending through said top panel in said housing for receiving said pinch roll, means mounting said pinch roll on said housing for movement between a retracted inoperative position in which said pinch roll lies retracted within the recess means and an extended operative position in which said pinch roll extends exteriorly of said housing in position for pressing the tape against the capstan, and means for moving said pinch roll between said positions.

References Cited in the file of this patent

UNITED STATES PATENTS

| | | |
|---|---|---|
| 2,658,955 | Carson | Nov. 10, 1953 |
| 2,699,332 | MacKenzie | Jan. 11, 1955 |